T. TRIPP.
Water-Filter.
No. 221,198.   Patented Nov. 4, 1879.
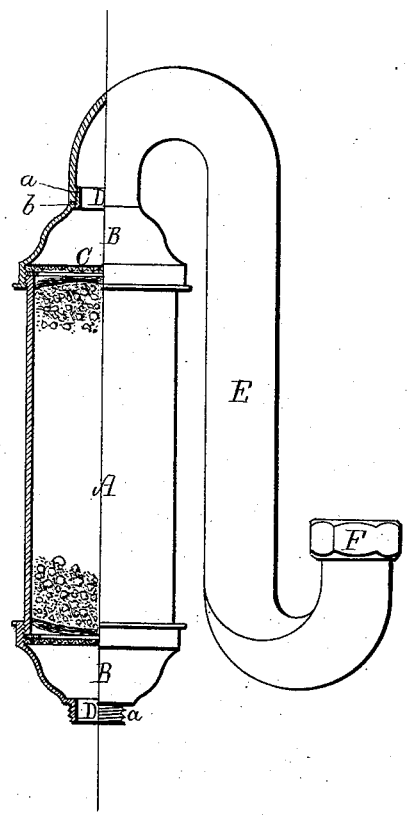
Witnesses.
Inventor.
Thomas Tripp.

UNITED STATES PATENT OFFICE.

THOMAS TRIPP, OF STOUGHTON, ASSIGNOR OF ONE-HALF OF HIS RIGHT TO ELIZABETH A. BROWN, OF CAMBRIDGE, MASSACHUSETTS.

IMPROVEMENT IN WATER-FILTERS.

Specification forming part of Letters Patent No. 221,198, dated November 4, 1879; application filed March 28, 1879.

*To all whom it may concern:*

Be it known that I, THOMAS TRIPP, of Stoughton, in the county of Norfolk and State of Massachusetts, have invented certain new and useful Improvements in Water-Filters, of which the following is a specification.

The drawing accompanying this specification represents a sectional elevation of a water-filter embracing my invention.

In this drawing, A denotes an upright straight cylindrical vessel of uniform diameter, and provided at its ends with twin-shaped heads or caps B B, which screw upon it, each of such heads having a perforated or reticulated screen or shelf, C, secured to its interior to prevent escape of any of the filtering medium from the interior of the case A.

The neck D of each head B B has a screw-thread, $a$, cut upon its periphery to engage a female screw, $b$, cut in one end of a pipe, E, by which connection is made with a faucet, the opposite end of said pipe being provided with a suitable coupling, F, by means of which the connection with the outlet of the faucet may be made.

It will be seen that the entrance end of the filter is considerably above the point F of connection with the faucet, and that the pipe E is the communication between the two.

Heretofore in the attachment of filters to faucets the connection has been a direct one between the two—that is to say, the filter has been screwed directly to the faucet. For this reason a comparatively shallow filter, which soon becomes clogged, must be employed, owing to the contracted space usually existing below the faucet—the bottom of a sink, for instance.

One object of my invention is to enable a filter of any desired depth to be used, and by the employment of the pipe E as a means of communication between the faucet and filter I am enabled to increase the depth of the latter to any desired extent, thereby greatly increasing its effective filtering capacity.

The screens C, being attached to and removable with the heads, are readily accessible for inspection or repair.

I propose filling the vessel A with bone-charcoal, and preferably place a piece of sponge or mass of cotton or other porous material over this charge of charcoal, and after a considerable quantity of water has been drawn through the vessel A its position upon the pipe E should be reversed, in order that the foreign substances lodged in the upper head, B, may be dislodged and expelled through the lower one, and the filter thereby cleansed.

I claim—

The herein-described filtering device for application to ordinary faucets, consisting of the S-shaped pipe E, adapted to be attached at its lower bend to the faucet, in combination with the filter A, attached to and extending downward from the upper bend of said pipe, substantially as and for the purposes set forth.

THOMAS TRIPP.

Witnesses:
F. CURTIS,
L. A. CURTIS.